United States Patent [19]

Wilson et al.

[11] Patent Number: 5,341,129
[45] Date of Patent: Aug. 23, 1994

[54] ZERO-MOTION DETECTION PROXIMITY SWITCH

[75] Inventors: Robert L. Wilson; David P. Minter, both of Martinsville, Va.

[73] Assignee: RPM Detection, Inc., Martinsville, Va.

[21] Appl. No.: 788,816

[22] Filed: Nov. 7, 1991

[51] Int. Cl.$^5$ .................................................. G08B 21/00
[52] U.S. Cl. .............................. 340/670; 340/309.15; 340/529; 340/673; 340/679; 364/474.16
[58] Field of Search ................................ 340/670–671, 340/673–676, 309.15, 529, 508, 523, 561, 551, 679–680; 324/654–657, 71.1, 160, 176, 178; 361/180; 200/61.45 R, 61.46; 408/9–11; 198/502.4; 193/DIG. 2; 377/55–56, 86–88, 111, 114; 364/474.16–474.2

[56] References Cited

U.S. PATENT DOCUMENTS

| | | | |
|---|---|---|---|
| 3,611,344 | 10/1971 | Couper | 340/575 X |
| 3,659,279 | 4/1972 | Wise | 340/679 X |
| 3,793,512 | 2/1974 | Lorenzen | 340/679 X |
| 3,976,962 | 8/1976 | Seeley | 335/153 |
| 4,104,621 | 8/1978 | Yanagishima et al. | 340/576 |
| 4,464,654 | 8/1984 | Klein | 340/676 |
| 4,524,243 | 6/1985 | Shapiro | 340/573 X |
| 4,806,882 | 2/1989 | Gehring et al. | 331/65 |
| 4,837,512 | 6/1989 | Suzuki | 324/306 |
| 4,854,329 | 8/1989 | Walruff | 340/576 X |
| 4,879,542 | 11/1989 | Elsey | 340/439 X |
| 4,912,291 | 3/1990 | Hepperle et al. | 340/626 X |
| 4,914,387 | 4/1990 | Santos | 324/166 |
| 4,947,151 | 8/1990 | Rosenberger | 340/426 |
| 5,012,226 | 4/1991 | Love | 340/576 |

FOREIGN PATENT DOCUMENTS

| | | | |
|---|---|---|---|
| 1070421 | 12/1959 | Fed. Rep. of Germany | 340/671 |
| 1146291 | 3/1963 | Fed. Rep. of Germany | 340/671 |
| 2407240 | 7/1975 | Fed. Rep. of Germany | 340/671 |
| 16755 | 6/1970 | Japan | 340/671 |
| 8504 | 3/1972 | Japan | 340/671 |

OTHER PUBLICATIONS

Pit & Quarry; p. 25; Feb. 1990.
Cutler-Hammer; Pub. No. 17608 and Pub. No. 16974, no dates.
Allen-Bradley; Bulletin No. 700; Sep. 1981.
Cuzner et al., "Disk Speed Detector", IBM Tech. Discl. Bull., vol. 12, No. 4, Sep. 1969.

Primary Examiner—Thomas Mullen
Attorney, Agent, or Firm—Leydig Voit & Mayer

[57] ABSTRACT

An apparatus for detecting of the loss of motion in a transporting system regardless of the position in which the system stops. The apparatus incorporates one or more detection switches coupled with two timers operating in series or parallel and determines when motion has ceased.

22 Claims, 6 Drawing Sheets

ZERO-MOTION DETECTION PROXIMITY SWITCH

The present invention relates to mechanisms for detecting the loss of motion of a device to which it is attached, and more particularly to the loss of rotational motion.

Most operations in industry are complex, having many interrelated functions. A single function is often vital to the operation of the whole system. For example, a transporting system may include several conveyors and when a failure causes one conveyor to malfunction and stop, the preceding conveyors continue to operate. As a result, the malfunctioning conveyor is jammed with enormous amounts of material before the problem is discovered. Consequently, many industrial applications require a system for detecting when a particular element of a transporting system has failed. This allows a control system to shut down other elements, thereby preventing unnecessary backups and damage.

An industrial environment is often harsh and plagued by conditions of high temperature, dirt, extreme dust and large power line voltage fluctuations. Existing motion detection mechanisms do not work well in this harsh manufacturing environment. Computers are particularly susceptible to power line fluctuations and dust. Mechanical detection switches are often plagued with worn-out and corroded components. Computers and infrared sensors are often hampered by dust, and voltage line fluctuations.

Some motion detection systems may provide a false reading if the system fails in such a manner that the motion verification detector is at the specific point where it is actuated. This problem is present in systems which only employ a single switch connected to a single level sensitive counter. Each time that the switch detects the moving part in front of the switch, the switch closes, and the counter is reset. If the machine stops in a position where the switch is open, the counter continues to count and signals an error after a predetermined period. However, if the machine stops in a position where the switch is closed, the counter is continually reset and will not indicate an error. Under these circumstances, the detector may indicate that a particular manufacturing process is operational, when in fact it has stopped.

Inductive proximity detection switches may be used to perform motion detection. However, one disadvantage with using an inductive proximity switch is that a plurality of switches having the same frequency will not work when placed in close proximity to each other. This anomaly is caused by interference with the inductive detecting sensor of one switch by the output signal of other switches.

SUMMARY OF THE INVENTION

The object of the present invention is to alleviate the above-mentioned disadvantages by offering simple, economical, and easy to operate mechanism for permitting the detection of the loss of motion in a manufacturing operation. It is another object of the invention to allow proximity detection switches to be mounted in close proximity to each other without interference. It is a further object of the invention to ensure that an alarm will be indicated by a level-sensitive timer regardless of which position the system stops in.

The present invention achieves these objects and overcomes the aforesaid problems by providing a simple, reliable mechanism for determining when a device to which it is attached has lost movement.

According to the present invention, a zero-motion detection apparatus for a material transporting system includes a sensor, primary and secondary timers, and an alarm/interrupt mechanism. The sensor is actuated by the movement of the transporting system. The primary and secondary timers count out a predetermined period. Each timer is connected to the sensor and is reset by a signal from the sensor. The alarm/interrupt mechanism generates an alarm or interrupts the movement of the transporting system in response to the primary timer having counted a first predetermined period. The alarm/interrupt mechanism also generates an alarm or interrupts the movement of the transporting system in response to the secondary timer having counted a second predetermined period.

DESCRIPTION OF THE PREFERRED EMBODIMENTS

Figure 1:
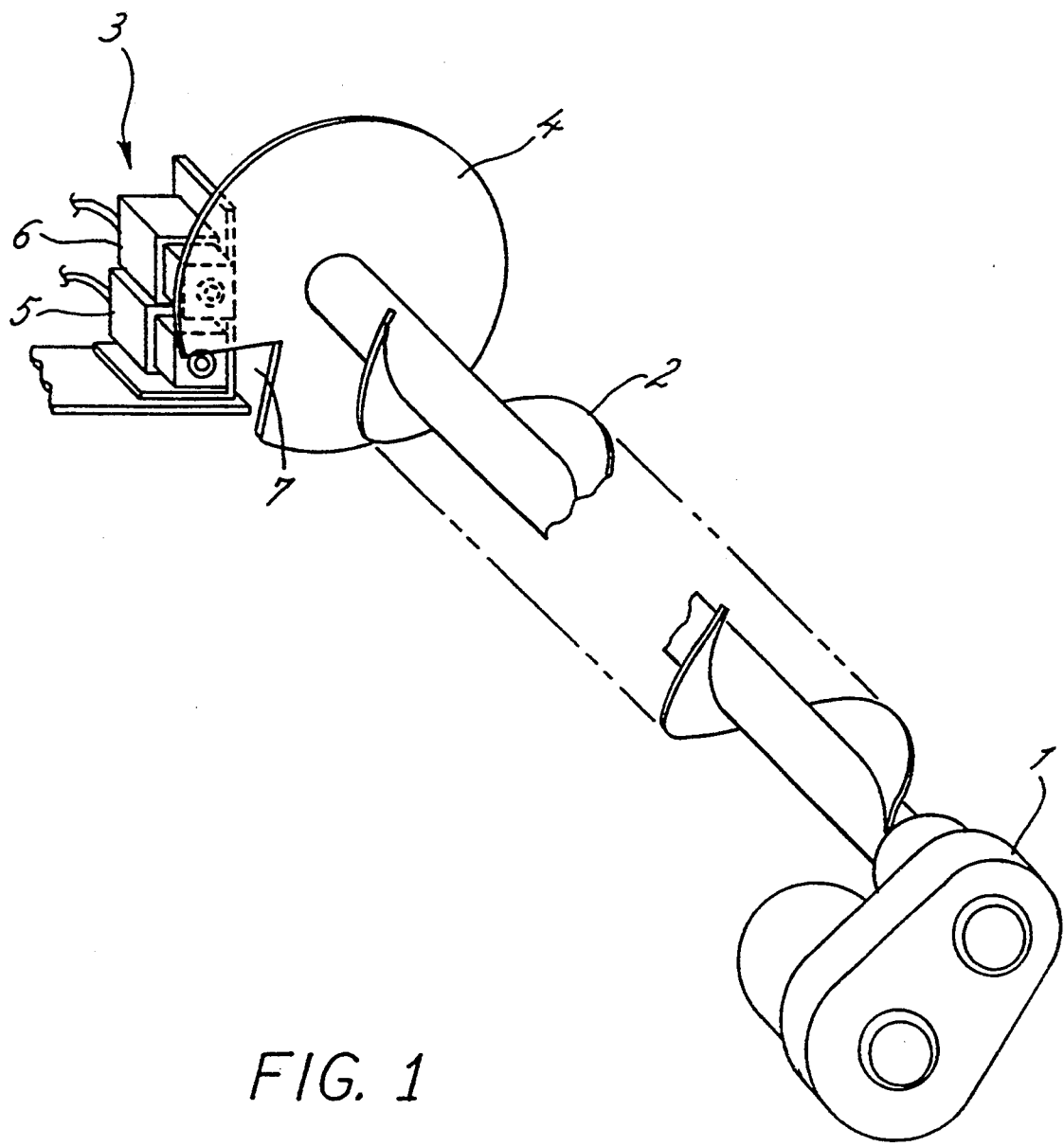
FIG. 1 is an oblique view of a rotational zero-motion detection proximity switch apparatus.

A zero motion detection apparatus embodying the present invention can be used to monitor the operation of many types of transporting systems which move materials. For example, the zero motion detection apparatus may be coupled to a conveyor belt system or an endless chain system to monitor the movement of a variety of materials, including raw or bulk materials, manufactured goods or parts, and packages. In FIG. 1, an embodiment of the zero motion detection apparatus 3 is coupled to an auger system having an electric motor 1 attached to a shaft 2. The motor 1 rotates the shaft 2 and transports or mixes material in the vicinity of the shaft 2. The zero motion detection apparatus 3 monitors the operation of the auger system and signals cessation of motion.

A zero motion detection apparatus embodying the invention can be variously configured. For example, in the embodiment shown in FIG. 1, the zero motion detection apparatus 3 comprises a target 4 and primary and secondary sensors 5,6 located adjacent to the target 4. The target 4 preferably includes at least one void 7 and may be attached, directly or indirectly, to the shaft 2. In the illustrated embodiment, the target 4 is attached directly to the shaft and the surface of the target 4 is perpendicular to an axis of the shaft 2. The target 4 is preferably positioned such that the void 7 passes over each of the sensors 5,6 as the target 4 rotates with the shaft 2.

Figure 2:
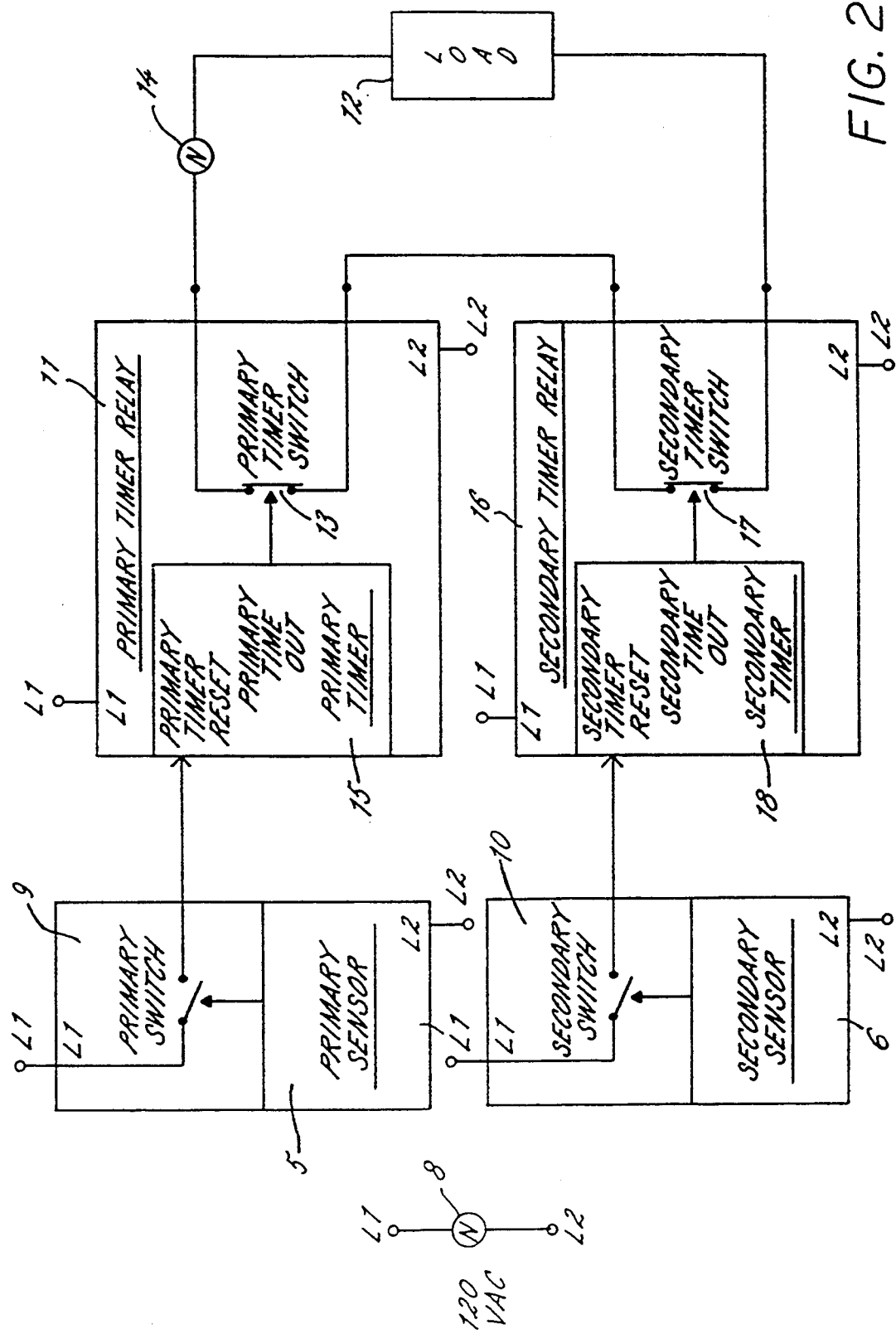
FIG. 2 is a schematic/block diagram of a processing circuit incorporated in the apparatus shown in FIG. 1.

The zero motion detection apparatus further includes circuitry for processing the signals of the primary and secondary sensors 5,6. For example, FIG. 2 shows a schematic diagram of a preferred embodiment of a processing circuit contained in the zero motion detection apparatus shown in FIG. 1. An alternating current source 8 provides operating current for the primary sensor 5, a primary timer relay 11, the secondary sensor 6, and a secondary timer relay 16 via pins L1 and L2. Pin L1 of the primary sensor 5 is used to supply power to an input of a primary switch 9. Pin L1 of the secondary sensor 6 is used to supply power to an input of a secondary switch 10. An output of the primary switch 9 is connected to a primary timer reset input of the primary timer relay 11, and an output of the secondary switch 10 is connected to a secondary timer reset input of the secondary timer relay 16.

The primary timer relay 11 and the secondary timer relay 16 are preferably of the 700 RTA series B type level-sensitive timing relays manufactured by Allen-Bradley. High voltage timing relays (i.e. relays which operate from a supply voltage greater than that typically used for integrated circuit logic levels) such as the 700 RTA, have been found to be more reliable in the manufacturing environment than other types of timers or logic devices which are susceptible to large voltage line fluctuations.

Typically, a primary timer switch 13 and a secondary timer switch 17 are serially connected between an external power supply 14 and an external load 12. The configuration of the primary and secondary switches 13,17 to signal an alarm condition is not critical. For example, the two switches may be connected in parallel to a ground (or a voltage source), and configured in the normally open configurations. In this configuration, the switches would normally be open. When either of the timers timed out, the corresponding switch will close, thereby grounding the output of the switches (or connecting the outputs to a voltage source). An alarm would monitor the output of the switches for a change in status. Alternatively, the primary timer switch 13 and secondary timer switch 17 may be connected to one or more external relays which are used to interrupt the flow of current from an external power supply 14 to an external load 12. The external load can be any device used in the manufacturing operation (e.g. conveyor belt) or an alarm indicator. These alternate embodiments are not preferred since an alarm mechanism is required to monitor the switches. In the preferred serial embodiment, the external machinery being monitored can be shut down automatically by breaking the circuit to the load 12.

The sensors are preferably inductive proximity detection devices which can sense the presence or absence of a target made of metal. Alternatively, other sensors can be used (i.e. mechanical, infrared, optical, sonic, etc.). However, it has been found that these other types of sensors are less reliable than the inductive proximity sensors in a harsh manufacturing environment. The inductive proximity sensors have an additional advantage in that the target can become warped, corroded, and covered with dust and the sensor will still operate. In addition, it is possible to employ a sensor which, instead of switching the voltage on and off, switches the voltage between predetermined levels. In a preferred embodiment, the sensors are of the E51-SCL 6P type available from Cutler-Hammer Eaton. Additionally, a sensor head for each of the respective primary and secondary sensors 5,6 is preferably mounted within one inch from the target 4.

The primary and secondary timer relays may function in either an "On-Delay" or an "Off-Delay" mode. In the "Off-Delay" mode, the timer relays have a solid state timer which is reset whenever a positive voltage is present on the timer reset input. When a voltage is not applied to the timer reset, the timer begins timing. If the timer is not reset within a predetermined period (e.g., 25 seconds in a preferred embodiment), the timer will "time out" and a timer switch will be opened.

Each of the timers are set to count for a predetermined period. The minimum period that the timer is set to count is a function of the amount of time between successive passes of the actuating portion of the target 4. For example, if the actuating portion of the target 4 passes in front of the sensor once in every 20 seconds, the timer will be reset once every 20 seconds. In order to prevent any false alarm signals from the zero motion detection apparatus, the timer must be set to count for a predetermined period greater than 20 seconds. Thus, the timer will be reset on each cycle before it can time out by counting the entire predetermined period. A predetermined period of much larger than 20 seconds would normally not be preferable because this would increase the time laps between when the system stops and when an alarm is indicated.

In the "On-Delay" mode, the timer relay has a solid state timer which is reset whenever a positive voltage is absent from the timer reset input. When a voltage is applied to the timer reset, the timer begins timing. If the timer is not reset within a predetermined period (e.g., 25 seconds in a preferred embodiment), the timer will "time out" and the timer switch will be opened.

The operating modes of the timing relays are summarized below:

TABLE 1

| Operating Mode | Voltage Applied To Timer Reset | Timer Switch (Normally Closed) | Timer |
| --- | --- | --- | --- |
| Off-Delay Mode | Yes | Closed | Reset |
| | No | Closed | Timing |
| | No | Open | Timed Out |
| On-Delay Mode | No | Closed | Reset |
| | Yes | Closed | Timing |
| | Yes | Open | Timed Out |

The primary switch 9 and the secondary switch 10 may be configured in a normally open or normally closed configuration. In the normally open mode, when the target is positioned so that the metal portion of the target is not immediately in front of the sensor, the switch is in the open position. When the metal portion of the target is in front of the sensor, the switch is in the closed position. In the normally closed configuration, when the target is positioned so that the metal portion of the target is not immediately in front of the sensor, the switch is in the closed position. When the metal portion of the target is present in front of the sensor, the switch is in the open position.

Figure 3:
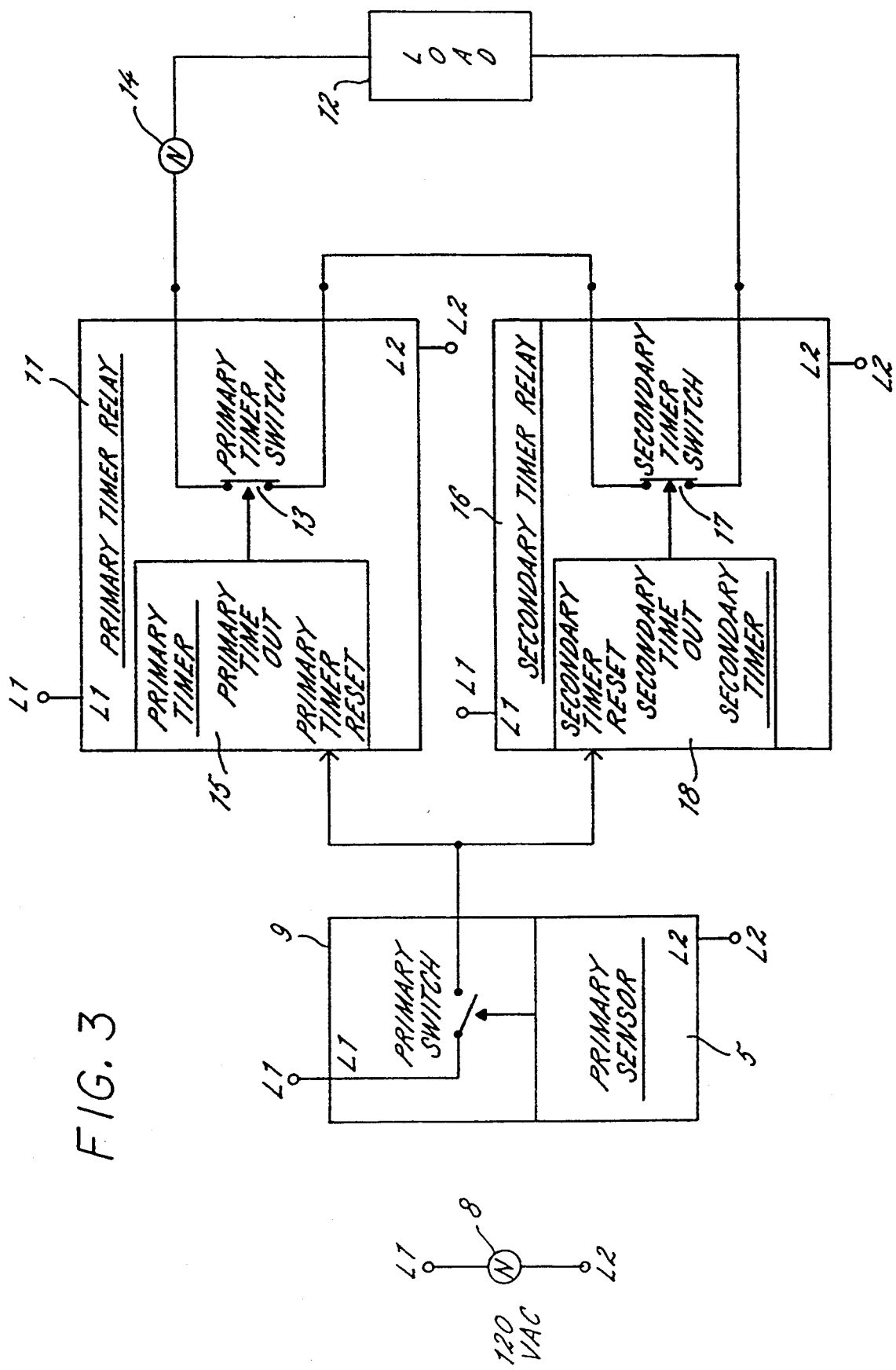
FIG. 3 is a schematic/block diagram of an alternative embodiment of a processing circuit incorporated in the apparatus shown in FIG. 1.

In one configuration of the circuit shown in FIG. 3, the primary switch 9 and the secondary switch 10 are both configured in the normally open (N.O.) mode, and both the primary timer 15 and the secondary timer 18 are configured in an on-delay mode. The timers operate as described in Table 1, and the switches operate as described above. Additionally, in the embodiment shown in FIG. 1, the target 4, primary sensor 5 and the secondary sensor 6 are positioned so that as the target moves past the sensors, the void is never over both sensors at the same time.

A preferred mode of operation will now be described with respect to one complete counterclockwise revolution of the target 4 shown in FIG. 1. As the void 7 passes over the primary sensor 5, the primary switch 9 will be open, and no voltage will be applied to the primary timer 15. When no voltage is applied to the primary timer 15, the timer is reset and will not time out. Whenever the void 7 is over the primary sensor 5, the metal portion of the target 4 will be over the secondary sensor 6. When the metal portion of the target 4 is over the secondary sensor 6, the secondary switch 10 will be closed, and voltage will be applied to the secondary timer 18. When voltage is applied to the secondary timer 18 the timer will time out if it is not reset within a predetermined period (preferably 25 seconds). If the target were to stop in this position, the secondary timer 18 would time out, opening the secondary timer switch 17, and interrupting power to the load 12.

As the target 4 continues to rotate, the metal portion of the target 4 passes over both the primary and the secondary sensors 5,6. When the sensors 5,6 detect the metal portion of the target 4, the primary and secondary switches 9,10 will be closed and voltage will be applied to both the primary and secondary timers 15,18. When voltage is applied to the primary and secondary timers 15,18, the timers will time out if they are not reset within a predetermined period (e.g., 25 seconds). If the target were to stop in this position, both the primary and secondary timer 15,18 would time out, opening both the primary and secondary timer switch 13,17, and interrupting power to the load 12.

As the target 4 continues to rotate, the void 7 passes over the secondary sensor 6. The primary sensor 5 will detect the metal portion of the target 4 while the secondary sensor 6 will detect the void 7. The secondary switch 10 will be open, and no voltage will be applied to the secondary timer 18. When no voltage is applied to the secondary timer 18, the timer is reset and will not time out. With the metal portion of the target 4 over the primary sensor 5, the primary switch 9 will be closed, and voltage will be applied to the primary timer 15. When voltage is applied to the primary timer 15, the timer will time out if it is not reset within a predetermined period (e.g., preferably 25 seconds). If the target were to stop in this position, the primary timer 15 would time out, opening the primary timer switch 13, and interrupting power to the load 12.

So long as the external target continues to rotate, the void will periodically pass over each sensors and reset the corresponding timer. Additionally, no matter where the target stops, the target 4 will be over at least one of the sensors, and the corresponding timer will time out after a predetermined period. When one of the timers times out, the serial connection between the primary timer switch 13, the secondary timer switch 17, the external load 12 and the external power source 14 will be broken, and the transporting system will stop or an alarm will result.

In the embodiment shown in FIG. 3, the shape of the target, the position of the sensors relative to the target, the configuration of the switches (normally open or normally closed), and the configuration of the sensors (on-delay or off-delay) are all factors in the operation of the circuit and can be varied in several ways. For example, the position of the sensors relative to the target can be broken down into four separate categories summarized in the table below.

TABLE 2

| CASE 1 | METAL OVER ONE SENSOR VOID OVER ONE SENSOR |
| CASE 2 | METAL OVER ONE SENSOR VOID OVER BOTH SENSORS |
| CASE 3 | METAL OVER BOTH SENSORS VOID OVER ONE SENSOR |
| CASE 4 | METAL OVER BOTH SENSORS VOID OVER BOTH SENSORS |

Case 1 is where the metal portion of the target 4 may be over one sensor and the void may be over one sensor, but the void or metal portion is never over both sensors simultaneously. This configuration could be accomplished using a target 4 such as the one shown in FIG. 6. The sensors would be spaced so that whenever a void 7 was over one sensor, a metal portion of the target 4 would be over the other sensor, and at no point would either the void 7 or metal portion be over both sensors.

Case 2 is where the metal portion may only be over one sensor at a time while the void is over both sensors; the metal is never over both sensors simultaneously. This configuration could be accomplished using a target in which the metal portion is only a quarter circle, and the sensors are spaced at least a quarter circle apart.

Case 3 is where the metal portion may be over both sensors while the void may only be over one sensor at a time; the void is never over both sensors simultaneously. This is the configuration shown in FIG. 7 and discussed in detail in the first and second embodiments.

Case 4 is where the metal portion may be over both sensors and the void is over both sensors; the metal or void is never over only one sensor. This configuration could be accomplished using the target shown in FIG. 7, and positioning the sensors so that both sensors detect the void and metal simultaneously.

In addition, the primary switch 9 or secondary switch 10 can be configured in either the normally open (N.O.) or normally closed (N.C.) configuration. The primary timer 15 or the secondary timer 18 can be configured in either the off-delay or on-delay mode. Thus, the apparatus described in the first embodiment can be configured in 16 possible states. Each of the 16 states can be used in each of the sensor/target designs described above (Case 1–4), for a total of 64 possible combinations. Of these 64 possible combinations, 24 are believed to be operative to detect the loss of motion regardless of where the system stops. Table 3 summarizes each of these combinations.

TABLE 3

| ROW | PRIMARY SWITCH | SECONDARY SWITCH | PRIMARY TIMER | SECONDARY TIMER | CASE 1 | CASE 2 | CASE 3 | CASE 4 |
| --- | --- | --- | --- | --- | --- | --- | --- | --- |
| 0 | N.O. | N.O. | ON-DELAY | ON-DELAY | YES | NO | YES | NO |
| 1 | N.O. | N.O. | ON-DELAY | OFF-DELAY | NO | NO | NO | YES |
| 2 | N.O. | N.O. | OFF-DELAY | ON-DELAY | NO | NO | NO | YES |
| 3 | N.O. | N.O. | OFF-DELAY | OFF-DELAY | YES | YES | NO | NO |

TABLE 3-continued

| ROW | PRIMARY SWITCH | SECONDARY SWITCH | PRIMARY TIMER | SECONDARY TIMER | CASE 1 | CASE 2 | CASE 3 | CASE 4 |
| --- | --- | --- | --- | --- | --- | --- | --- | --- |
| 4 | N.O. | N.C. | ON-DELAY | ON-DELAY | NO | NO | NO | YES |
| 5 | N.O. | N.C. | ON-DELAY | OFF-DELAY | YES | NO | YES | NO |
| 6 | N.O. | N.C. | OFF-DELAY | ON-DELAY | YES | YES | NO | NO |
| 7 | N.O. | N.C. | OFF-DELAY | OFF-DELAY | NO | NO | NO | YES |
| 8 | N.C. | N.O. | ON-DELAY | ON-DELAY | NO | NO | NO | YES |
| 9 | N.C. | N.O. | ON-DELAY | OFF-DELAY | YES | YES | NO | NO |
| A | N.C. | N.O. | OFF-DELAY | ON-DELAY | YES | NO | YES | NO |
| B | N.C. | N.O. | OFF-DELAY | OFF-DELAY | NO | NO | NO | YES |
| C | N.C. | N.C. | ON-DELAY | ON-DELAY | YES | YES | NO | NO |
| D | N.C. | N.C. | ON-DELAY | OFF-DELAY | NO | NO | NO | YES |
| E | N.C. | N.C. | OFF-DELAY | ON-DELAY | NO | NO | NO | YES |
| F | N.C. | N.C. | OFF-DELAY | OFF-DELAY | YES | NO | YES | NO |

In Table 3, each row represents one of the possible 16 states, and the last four columns (cases 1–4) represent the possible target and sensor combinations discussed above. A "yes" signifies that the indicated target design, sensor location, sensor configuration, and switch configuration is operative to detect the loss of motion regardless of where the system stops.

The first embodiment of the circuit described above corresponds to the configuration described in Row 0, Case 3 of Table 3. In Row 0, the primary and secondary switch 9,10 are normally open (N.O.), and the primary and secondary timer 15,16 are operated in the on-delay mode. Case 3 is where the metal portion may be over both sensors while the void may only be over one sensor at a time; the void is never over both sensors simultaneously. This corresponds to the configuration of the first embodiment described above, and shown in FIG. 3.

The speed of the target being detected is preferably correlated with the response time of the timer being used. For example, if the timer has a minimum reset time of 0.025 seconds, the actuating portion of the target, e.g., void, should preferably be in front of the sensor for a minimum of 0.025 seconds to reset the timers. In the sample target embodiments of FIGS. 6 and 7, each void preferably has a width of 3.25 inches and each target preferably has a circumference of 31.42 inches. In the preferred embodiment, a 1500 RPM motor 1 is coupled with a 15 to 1 gear reduction mechanism to power the rotating shaft 2.

In the first embodiment, the use of the second sensor provides several fail safe mechanisms. One of the sensors may fail in a mode which results in the output of the sensor oscillating even though the target is not moving. In this instance, there is a high probability that the second sensor will still detect a system failure.

An additional fail safe characteristic which improves reliability is having a target with a relatively small area which resets the timer (e.g. a target reset area less than 50% of the overall target area). For example, in the above described embodiment, the primary timer 15 and secondary timer 18 are only reset when the void 7 is over the corresponding sensor. In this configuration, if one of the timers were to fail such that it would never time out, the other timer would have a high probability of detecting when the target had stopped moving. For example, in the preferred embodiment, the target 4 has a circumference approximately equal to 31.42 inches. The void 7 in the target has an opening at the outer edge of the circle of 3.25 inches. Thus, there is approximately only a 10% probability that a single sensor will not detect that the target has stopped moving, even if the second sensor has failed. It should be noted that although it is desirable to minimize the reset area, the reset area must be large enough so that it is in front of the sensor long enough to reset the timer.

In the first embodiment, it is often desirable to locate the primary sensor 5 and the secondary sensor 6 in close proximity to each other. Inductive proximity sensors, however, may interfere with each other when operating two adjacent sensors at the same frequency. Some manufactures offer custom designed sensors which operate at different frequencies to overcome this problem. FIG. 1, shows the primary sensor 5 mounted over the secondary sensor 6 along a vertical axis with one sensor ⅛ inch offset from the vertical axis. In this position, the sensors do not interfere with each other. This is a significant advantage, in that the same type of sensors operating at the same frequency can now be mounted in close proximity.

In a second embodiment of the circuit, the secondary sensor is not needed, and only the primary sensor is used. For example, FIG. 3 shows a schematic diagram of a preferred embodiment of a processing circuit contained in the zero motion detection apparatus 3 shown in FIG. 1. An alternating current source 8 provides operating current for the primary sensor 5, a primary timer relay 11, and a secondary timer relay 16 via pins L1 and L2. Pin L1 of the primary sensor 5 is also used to supply power to an input of a primary switch 9. An output of the primary switch 9 is connected to a primary timer reset input of the primary timer relay 11, and to a secondary timer reset input of the secondary timer relay 16. As described above, the primary timer switch 13, the secondary timer switch 17 are serially connected between the external power supply 14 and the load 12.

One of the timer relays should be configured in an on-delay mode, and the other timer relay should be configured in an off-delay mode. The primary timer relay 11 should operate in the opposite mode of the secondary timer relay 16. The primary sensor 5 may be configured in a normally open or a normally closed configuration. In the description of the second embodiment that follows, the primary switch 9 will be configured in a normally open mode, the primary timer relay 11 will be configured in the off-delay mode, and the secondary timer relay 16 will be configured in the on-delay mode.

The apparatus according to the invention operates as follows. As the target 4 rotates, the void 7 passes over the primary sensor 5 once for each rotation - opening and closing the primary switch 9. Stepping through a complete rotation, as the metal portion of the target 4 rotates over the primary sensor 5, the primary switch 9 will be closed. In this state, the primary timer 15 will be reset, and the secondary timer 18 will be timing. If the shaft 2 were to stop with the metal portion of the target 4 over the primary sensor 5, the secondary timer 18 would time out after a predetermined period (preferably 25 seconds). The secondary timer switch 17 would then open and current to the load would be interrupted. As the void 7 of the target 4 passes over the primary sensor 5, the primary switch 9 will be open. In this state, the secondary timer 15 will be reset, and the primary timer 18 will be timing. If the shaft 2 were to stop with the void 7 of the target 4 over the primary sensor 5, the primary timer 18 will time out after a predetermined period (preferably 25 seconds). The primary timer switch 13 will open, and current to the load 12 will be interrupted.

As long as the target 4 continues to rotate, both the primary timer 15 and the secondary timer relay 16 will be reset on every rotation, and thus, will not time out. However, when the primary sensor 5 detects that the shaft 2 has stopped rotating, either the primary timer 11 or the secondary timer relay 16 will time out and open the corresponding timer switch, disconnecting the external power supply 14 from the load 12. No matter where the target 4 stops, either the primary or the secondary timer will time out after the predetermined period (25 seconds).

Figure 6:
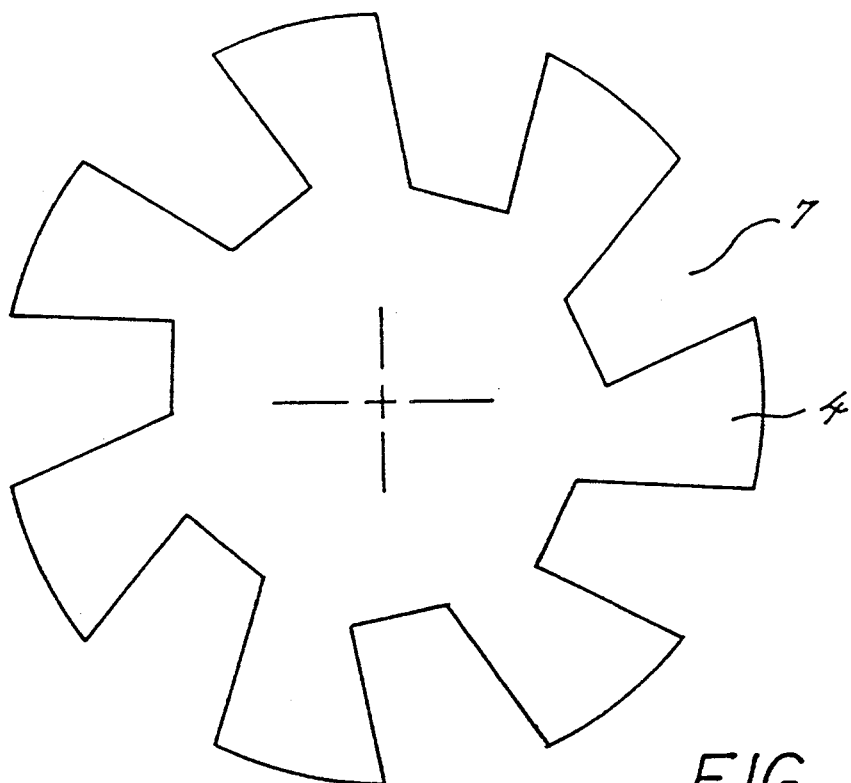
FIG. 6 is a front view of a first embodiment of a rotational detection target.
Figure 7:
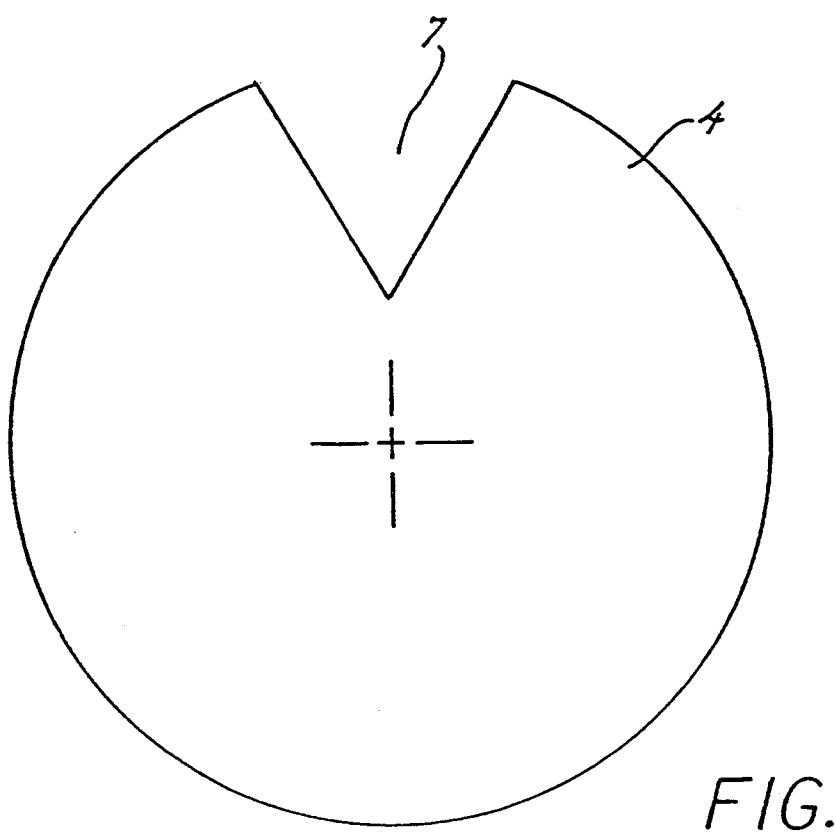
FIG. 7 is a front view of a second embodiment of the rotational detection target.

The shape of the target 4 is not critical for either the first or second embodiments. Any target that is capable of periodically actuating a sensor will function. Examples of two suitable targets are shown in FIGS. 6 and 7. The target in FIG. 6 has an advantage for high speed applications in that it is symmetrically balanced around its axis of rotation. Other target designs will also work. For example, a half circle, quarter circle, etc., will also function. The target is not limited to rotational motion and may be designed for linear motion. For example, a series of targets may be positioned linearly along a conveyor belt. The target may even comprise items which are transported by the system. For example, the sensors could also be used to detect metal containers or metal parts moving along a conveyor belt or other transport mechanism.

Figure 4:
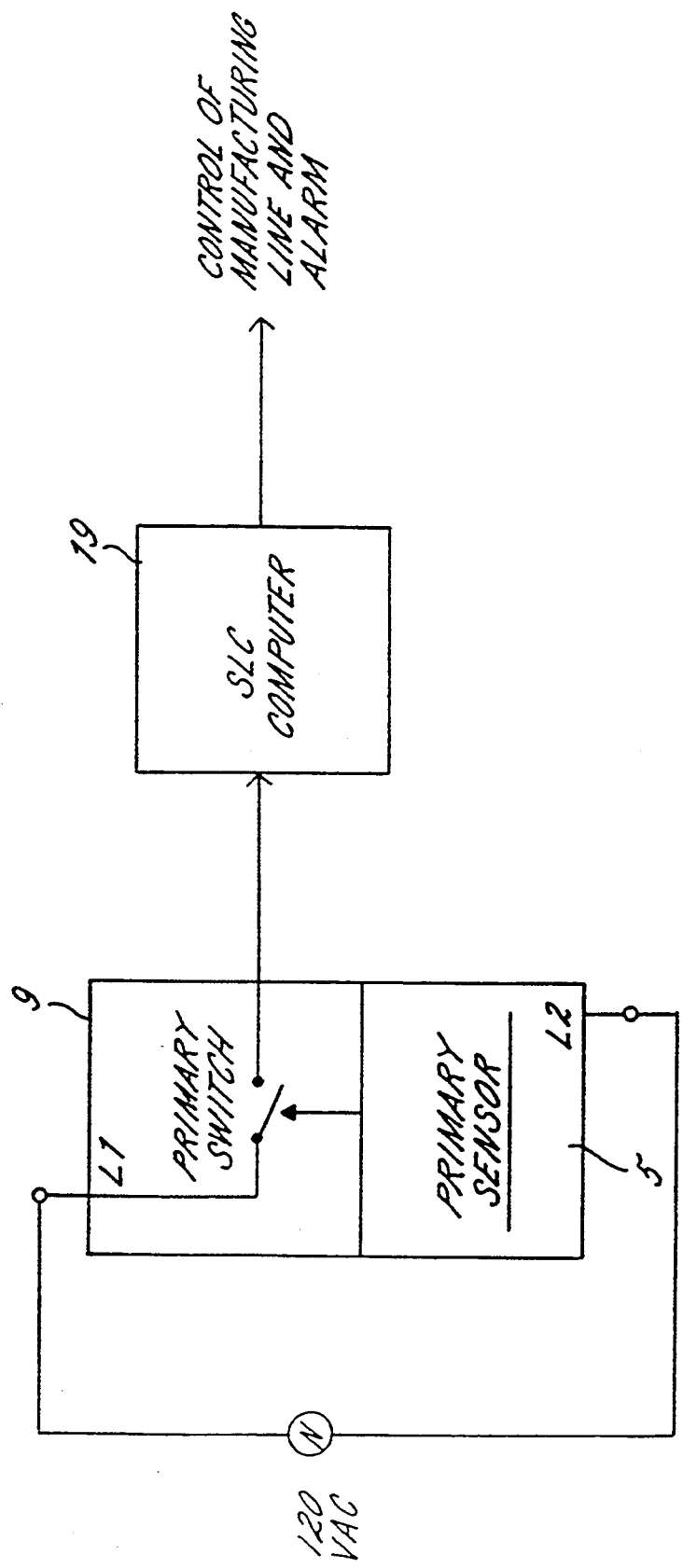
FIG. 4 is a schematic/block diagram of another alternative embodiment of a processing circuit incorporated in the apparatus shown in FIG. 1.
Figure 5:
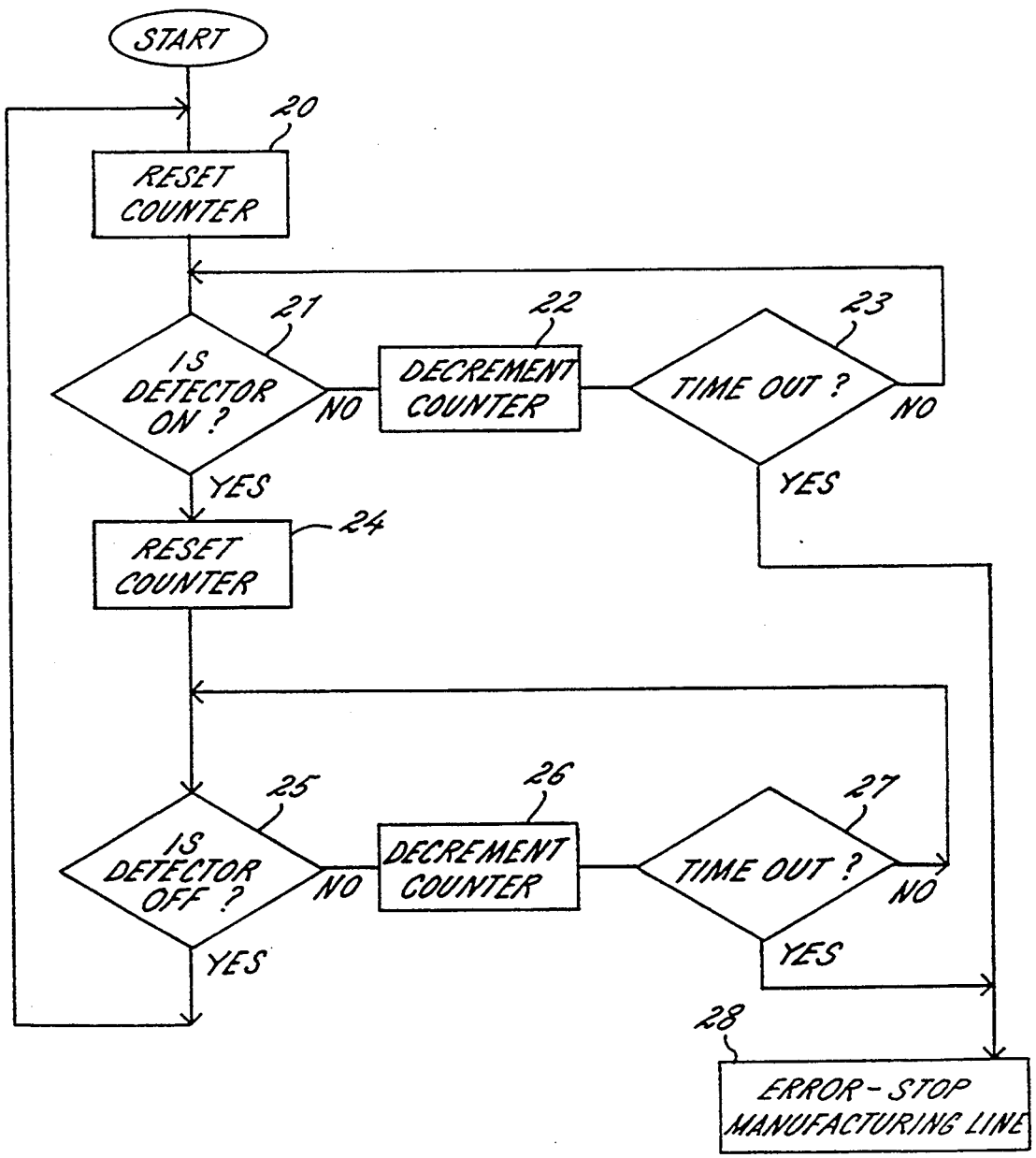
FIG. 5 is a flow diagram of a program of prerecorded instructions enabling the implementation of the apparatus shown in FIG. 4.

A third embodiment of the invention is shown in FIG. 4. The output of the primary switch 9 is connected directly to a computer 19. The computer 19 is preferably an industrial type computer such as an SLC computer. The primary sensor operates as described above. The operation of the computer 19 is detailed in the flow chart of FIG. 5.

The program is initialized by resetting a counter 20. The input is then sampled to determine if the primary switch 9 is closed 21. If the primary switch 9 is not closed, a counter is decremented 22. A check is made to determine whether a time out period (i.e. 25 seconds) has elapsed 23. If the time-out period has elapsed, an error is signaled, and the manufacturing line is stopped 28. If the counter has not timed-out, the primary switch 9 is again checked. This cycle is repeated until either the primary switch 9 opens, or the counter times out 23. If the primary switch 9 opens, the counter is again reset 24. The primary switch 9 is again sampled to determine if it is still open 25. If the primary switch 9 is not open, the counter is decremented 26. If the time-out period has elapsed (i.e. 25 seconds), an error is signaled, and the manufacturing line is stopped 28. If the counter has not timed-out, the primary switch 9 is again checked. This cycle is repeated until either the primary switch 9 closes, or the counter times out. If the primary switch 9 closes, the counter is again reset 20, and the cycle repeats itself. Thus, the program monitors the primary switch 9 to ensure that it opens and closes within a predetermined period, and issues an alarm whenever the target 4 no longer causes the primary switch 9 to be actuated.

We claim:

1. A zero motion detection apparatus for a material transporting system, the apparatus comprising:
   sensor means for detecting movement of the material transporting system;
   primary timer means, coupled to the sensor means, for counting the time during which no movement is detected by the sensor means up to a first predetermined period, the time counted by said primary timer means being reset in response to the sensor means detecting movement;
   secondary timer means, coupled to the sensor means, for counting the time during which no movement is detected by the sensor means up to a second predetermined period, the time counted by said secondary timer means being reset in response to the sensor means detecting movement; and
   alarm/interrupt means for generating an alarm or interrupting movement of the transporting system in response to the primary timer means having counted the first predetermined period and for generating an alarm or interrupting movement of the transporting system in response to the secondary timer means having counted the second predetermined period.

2. A zero-motion detection apparatus as recited in claim 1 wherein the sensor means is a single sensor coupled to both the primary timer means and the secondary timer means.

3. A zero-motion detection apparatus as recited in claim 1 wherein the sensor means includes a primary induction proximity sensor having a primary sensor head and being coupled to the primary timer means and a secondary induction proximity sensor having a secondary sensor head and being coupled to the secondary timer means, wherein the primary sensor is mounted in close proximity to the secondary sensor along an axis with the secondary sensor being offset from the axis.

4. A zero-motion detection apparatus as recited in claim 1 wherein said alarm/interrupt means includes a primary timer switch responsive to the primary timer means and a secondary timer switch responsive to the secondary timer means, each switch being coupled to an external load.

5. A zero-motion detection apparatus as recited in claim 4 wherein the primary timer switch and the secondary timer switch are connected in series with the external load.

6. A zero-motion detection apparatus as recited in claim 4 wherein the primary timer switch and the secondary timer switch are configured in a normally closed configuration.

7. A zero-motion detection apparatus as recited in claim 4 wherein the primary timer switch and the secondary timer switch are connected in parallel.

8. A zero-motion detection apparatus as recited in claim 7 wherein the primary timer switch and the secondary timer switch are configured in a normally open configuration.

9. A zero-motion detection apparatus as recited in claim 1, wherein the primary timer means and the secondary timer means are implemented by a digital computer means, and wherein the first predetermined period and the second predetermined period are fixed constants.

10. A zero-motion detection apparatus as recited in claim 1 wherein the primary timer means and the secondary timer means each include a high voltage level-sensitive timer relay.

11. A zero-motion detection apparatus as recited in claim 1 wherein the zero-motion detection apparatus detects loss of motion of at least a portion of the material transporting system for a predetermined period of time.

12. A zero motion detection apparatus for a material transporting system, the apparatus comprising:
sensor means for detecting movement of at least a portion of the material transporting system;
primary timer means, coupled to the sensor means, for counting the time during which no movement is detected by the sensor means up to a first predetermined period, the time counted by said primary timer means being reset in response to the sensor means detecting movement;
secondary timer means, coupled to the sensor means, for counting the time during which no movement is detected by the sensor means up to a second predetermined period, the time counted by said secondary timer means being reset in response to the sensor means detecting movement;
alarm/interrupt means, responsive to the primary timer means having counted the first predetermined period or the secondary timer means having counted the second predetermined period, for generating an alarm or interrupting movement of the transporting system; and
a target cooperatively arranged with the sensor means and having a target reset area less than 50% as large as an overall target travel area but large enough to activate the sensor means and thereby reset the primary or secondary timer means.

13. A zero motion detection apparatus for a material transporting system, the apparatus comprising:
motion sensing means for outputting a sensor signal responsive to motion of at least one portion of the material transporting system; and
timing control means including:
primary timer means, responsive to the sensor signal, for counting the time during which no sensor signal is present up to a first predetermined period, the time counted by said primary timer means being reset whenever the sensor signal is present;
secondary timer means, responsive to the sensor signal, for counting the time during which the sensor signal is present up to a second predetermined period, the time counted by said secondary timer means being reset whenever the sensor signal is not present; and
alarm/interrupt means for generating an alarm or interrupting movement of the transporting system whenever the primary timer means has counted the first predetermined period and for generating an alarm or interrupting movement of the transporting system whenever the secondary timer means has counted the second predetermined period.

14. A zero-motion detection apparatus as recited in claim 13 wherein the primary timer means includes a primary level-sensitive solid state timer relay, the secondary timer means includes a secondary level-sensitive solid state timer relay, and the alarm/interrupt means comprises a primary timer switch responsive to the primary level-sensitive solid state timer relay and a secondary timer switch responsive to the secondary level-sensitive solid state timer relay, the primary timer switch and the secondary timer switch being connected in series with an external load.

15. A zero-motion detection apparatus as recited in claim 13 wherein the motion sensing means is not more than one sensor, and wherein the zero-motion detection apparatus detects loss of motion of said at least one portion of the material transporting system for a predetermined period of time.

16. A zero motion detection apparatus for a material transporting system, the apparatus comprising:
motion sensing means for outputting a sensor signal responsive to motion of at least a portion of the material transporting system; and
timing control means including:
primary timer means, responsive the sensor signal, for counting the time during which no sensor signal is present up to a first predetermined period, the time counted by said primary timer means being reset whenever the sensor signal is present;
secondary timer means, responsive to the sensor signal, for counting the time during which the sensor signal is present up to a second predetermined period, the time counted by said secondary timer means being reset whenever the sensor signal is not present; and
alarm/interrupt means for generating an alarm or interrupting movement of the transporting system whenever the primary timer means has counted the first predetermined period or the secondary timer means has counted the second predetermined period, and
a metal target having a void, the metal target being positioned such that the void periodically passes over the motion sensing means as the metal target is rotated.

17. A zero motion detection apparatus for a material transporting system, the apparatus comprising:
a primary switch responsive to motion of portions of the material transporting system and having an input connected to an external voltage source and an output for outputting a first signal;
a primary timing relay having a level sensitive timer reset input connected to the output of the primary switch, a primary timer for counting the time during which no first signal is received from the primary switch up to a first predetermined period, the time counted by said primary timer being reset when the first signal is received from the primary switch, and a primary timer switch responsive to the primary timer having counted the first predetermined period;
a secondary switch responsive to motion of said portions of the material transporting system and having an input connected to an external voltage source and an output for outputting a second signal; and
a secondary timing relay having a level sensitive timer reset input connected to the output of the secondary switch, a secondary timer for counting the time during which no second signal is received from the secondary switch up to a second predetermined period, the time counted by said secondary timer being reset when the second signal is received from the secondary switch, and a secondary timer switch responsive to the secondary timer having counted the second predetermined period;

wherein said primary timer switch and said secondary timer switch are connected in series.

18. A zero-motion detection apparatus as recited in claim 17 wherein said primary switch includes an inductive proximity detection switch and said secondary switch includes an inductive proximity detection switch.

19. A zero-motion detection apparatus as recited in claim 17 further comprising a metal target having a void which is positioned such that the void periodically passes over both the primary switch and the secondary switch as the metal target is rotated, the primary switch being mounted in close proximity to the secondary switch along an axis, the primary switch and the secondary switch having the same operating frequency and being mounted such that the secondary switch is off-set from the axis.

20. A zero motion detection apparatus for a material transporting system, the apparatus comprising:

primary sensor means for outputting a primary reset signal in response to motion of portions of the material transporting system;

primary timing means for counting the time during which no primary reset signal is output by the primary sensor means up to a first predetermined period, the time counted by said primary timing means being reset in response to the primary reset signal being output by the primary sensor means, and for outputting a primary time out signal in response to the first predetermined period being counted;

secondary sensor means for outputting a secondary reset signal in response to motion of said portions of the material transporting system;

secondary timing means for counting the time during which no secondary reset signal is output by the secondary sensor means up to a second predetermined period, the time counted by said secondary timing means being reset in response to the secondary reset signal being output by the secondary sensor means, and for outputting a secondary time out signal in response to the second predetermined period being counted; and relay means for receiving the primary time out signal and the secondary time out signal and outputting an alarm signal or interrupting movement of the transporting system in response to the primary timing means counting the first predetermined period and for outputting an alarm signal or interrupting movement of the transporting system in response to the secondary timing means counting the second predetermined period, whereby the alarm signal is output or movement of the transporting system is interrupted whenever motion of said portions of the material transporting system ceases for a predetermined period of time, regardless of when motion of said portions of the material transporting system ceases.

21. A material transporting system for moving material, the system comprising:

means for moving the material; and a zero-motion detection apparatus including:

a target coupled to the moving means for moving responsive to the movement of at least a portion of the material;

sensor means for detecting the movement of the target;

primary timer means, coupled to said sensor means, for counting the time during which no movement is detected by said sensor means up to a first predetermined period, the time counted by said primary timer means being reset in response to said sensor means detecting movement;

secondary timer means, coupled to said sensor means, for counting the time during which no movement is detected by said sensor means up to a second predetermined period, the time counted by said secondary timer means being reset in response to said sensor means detecting movement; and alarm/interrupt means for generating an alarm or interrupting movement of the transporting system in response to said primary timer means having counted the first predetermined period or said secondary timer means having counted the second predetermined period;

wherein the zero-motion detection apparatus detects when absence of the movement of the material persists for a predetermined period of time.

22. A zero-motion detection apparatus as recited in claim 21 wherein the target is a metal target and has a void, the metal target being positioned such that the void periodically passes over the sensor means as the metal target is rotated.

* * * * *